US008279232B2

(12) United States Patent
Barrus et al.

(10) Patent No.: US 8,279,232 B2
(45) Date of Patent: Oct. 2, 2012

(54) FULL FRAMEBUFFER FOR ELECTRONIC PAPER DISPLAYS

(75) Inventors: John W. Barrus, Menlo Park, CA (US); Guotong Feng, Mountain View, CA (US)

(73) Assignee: Ricoh Co., Ltd., Tokyo (JP)

( * ) Notice: Subject to any disclaimer, the term of this patent is extended or adjusted under 35 U.S.C. 154(b) by 685 days.

(21) Appl. No.: 12/059,441

(22) Filed: Mar. 31, 2008

(65) Prior Publication Data

US 2008/0309674 A1 Dec. 18, 2008

Related U.S. Application Data

(60) Provisional application No. 60/944,415, filed on Jun. 15, 2007.

(51) Int. Cl.
*G09G 5/36* (2006.01)
*G06F 13/00* (2006.01)

(52) U.S. Cl. ........................................ 345/545; 345/536

(58) Field of Classification Search ........................ None
See application file for complete search history.

(56) References Cited

U.S. PATENT DOCUMENTS 4,065,770 A 12/1977 Berry
4,367,465 A 1/1983 Mati et al.
4,930,875 A 6/1990 Inoue et al.
5,029,257 A 7/1991 Kim
5,122,791 A 6/1992 Gibbons
5,509,085 A 4/1996 Kakutani
5,605,406 A 2/1997 Bowen
5,608,420 A 3/1997 Okada
5,754,156 A 5/1998 Erhart et al.
5,815,134 A 9/1998 Nishi
5,963,714 A * 10/1999 Bhattacharjya et al. ....... 358/1.9
6,067,185 A 5/2000 Albert et al.
6,147,671 A 11/2000 Agarwal
6,191,771 B1 2/2001 Kondoh
6,243,063 B1 6/2001 Mayhew et al.
6,285,774 B1 9/2001 Schumann et al.
6,327,017 B2 12/2001 Barberi et al.
6,504,524 B1 1/2003 Gates et al.
6,563,957 B1 5/2003 Li et al.
6,721,458 B1 4/2004 Ancin (Continued)

FOREIGN PATENT DOCUMENTS

CN 1519620 8/2004

(Continued)

OTHER PUBLICATIONS

Bresenham, J.E., *Algorithm for Computer Control of a Digital Plotter*, IBM Systems Journal, 1965, pp. 25-30, vol. 4, No. 1.

(Continued)

*Primary Examiner* — Joni Hsu
*Assistant Examiner* — Michelle Chin
(74) *Attorney, Agent, or Firm* — Patent Law Works, LLP

(57) ABSTRACT

A system and a method are disclosed for updating a bi-stable display includes a framebuffer for storing waveforms for each pixel individually. The system includes determining a current state of a pixel of the bi-stable display; determining a desired state of the pixel of the bi-stable display; and updating the pixel by applying a determined control signal to the pixel to drive the pixel from the current state to the final state. Updating each pixel occurs independently of the other pixels of the bi-stable display.

15 Claims, 4 Drawing Sheets

U.S. PATENT DOCUMENTS

| | | | | |
|---|---|---|---|---|
| 6,738,039 | B2 | 5/2004 | Goden | |
| 6,791,716 | B1 | 9/2004 | Buhr et al. | |
| 6,804,191 | B2 | 10/2004 | Richardson | |
| 6,809,724 | B1 | 10/2004 | Shiraishi et al. | |
| 6,850,217 | B2 | 2/2005 | Huang et al. | |
| 6,864,875 | B2 | 3/2005 | Drzaic et al. | |
| 6,901,164 | B2 | 5/2005 | Sheffer | |
| 7,012,600 | B2 | 3/2006 | Zehner et al. | |
| 7,034,814 | B2 | 4/2006 | Gong et al. | |
| 7,075,502 | B1 | 7/2006 | Drzaic et al. | |
| 7,119,772 | B2 | 10/2006 | Amundson et al. | |
| 7,200,242 | B2 | 4/2007 | Murakami | |
| 7,280,103 | B2 | 10/2007 | Taoka et al. | |
| 7,372,594 | B1 | 5/2008 | Kusakabe et al. | |
| 7,456,808 | B1 | 11/2008 | Wedding et al. | |
| 7,733,311 | B2 | 6/2010 | Amundson et al. | |
| 7,804,483 | B2 | 9/2010 | Zhou et al. | |
| 7,839,381 | B2 * | 11/2010 | Zhou et al. | 345/107 |
| 8,041,291 | B2 | 10/2011 | Hullot et al. | |
| 2002/0056805 | A1 | 5/2002 | Bos et al. | |
| 2003/0011579 | A1 | 1/2003 | Gong et al. | |
| 2003/0063575 | A1 | 4/2003 | Kinjo | |
| 2003/0095094 | A1 | 5/2003 | Goden | |
| 2003/0137521 | A1 | 7/2003 | Zehner et al. | |
| 2004/0002023 | A1 | 1/2004 | Sowinski | |
| 2004/0028256 | A1 | 2/2004 | Murakami | |
| 2004/0165115 | A9 | 8/2004 | Daly | |
| 2005/0013501 | A1 | 1/2005 | Kang et al. | |
| 2005/0116924 | A1 * | 6/2005 | Sauvante et al. | 345/108 |
| 2005/0174591 | A1 | 8/2005 | Sowinski et al. | |
| 2005/0179642 | A1 | 8/2005 | Wilcox et al. | |
| 2005/0248575 | A1 | 11/2005 | Chou et al. | |
| 2005/0280626 | A1 | 12/2005 | Amundson et al. | |
| 2005/0281334 | A1 | 12/2005 | Walker et al. | |
| 2006/0066503 | A1 | 3/2006 | Sampsell et al. | |
| 2006/0066595 | A1 | 3/2006 | Sampsell et al. | |
| 2006/0112382 | A1 * | 5/2006 | Glass et al. | 717/168 |
| 2006/0164405 | A1 | 7/2006 | Zhou | |
| 2006/0169980 | A1 | 8/2006 | Morita et al. | |
| 2006/0170648 | A1 * | 8/2006 | Zhou et al. | 345/107 |
| 2007/0002009 | A1 | 1/2007 | Pasch et al. | |
| 2007/0013627 | A1 | 1/2007 | Hsieh et al. | |
| 2007/0052667 | A1 | 3/2007 | Zhou et al. | |
| 2007/0057905 | A1 | 3/2007 | Johnson et al. | |
| 2007/0057906 | A1 | 3/2007 | Johnson et al. | |
| 2007/0075949 | A1 | 4/2007 | Lu et al. | |
| 2007/0085819 | A1 | 4/2007 | Zhou et al. | |
| 2007/0087756 | A1 | 4/2007 | Hoffberg | |
| 2007/0140351 | A1 | 6/2007 | Ho | |
| 2007/0205978 | A1 * | 9/2007 | Zhou et al. | 345/107 |
| 2007/0206262 | A1 | 9/2007 | Zhou | |
| 2008/0084600 | A1 | 4/2008 | Bita et al. | |
| 2008/0111778 | A1 | 5/2008 | Shen et al. | |
| 2008/0135412 | A1 | 6/2008 | Cortenraad et al. | |
| 2008/0198098 | A1 | 8/2008 | Gelbman et al. | |
| 2008/0243344 | A1 | 10/2008 | Cassey et al. | |
| 2011/0285754 | A1 | 11/2011 | Harrington et al. | |

FOREIGN PATENT DOCUMENTS

| | | | |
|---|---|---|---|
| CN | 1577471 | | 2/2005 |
| CN | 1589462 | | 3/2005 |
| CN | 1942918 | | 4/2007 |
| JP | 02-136915 | A | 5/1990 |
| JP | 2003-256134 | A | 9/2003 |
| JP | 2006-243364 | A | 9/2006 |
| JP | 2006243364 | | 9/2006 |
| JP | 2007-102042 | A | 4/2007 |
| JP | 2007-241405 | A | 9/2007 |
| TW | 200504442 | | 2/2005 |
| WO | WO 03/044765 | A2 | 5/2003 |
| WO | WO 2004/034366 | A1 | 4/2004 |
| WO | 2005006296 | | 1/2005 |
| WO | WO 2005/027087 | A1 | 3/2005 |
| WO | WO2005031688 | | 4/2005 |
| WO | WO2005054933 | | 6/2005 |
| WO | WO 2005/073949 | | 8/2005 |
| WO | WO 2005/078692 | A1 | 8/2005 |
| WO | WO 2005/086131 | A1 | 9/2005 |
| WO | 2005101362 | | 10/2005 |
| WO | WO 2005/093705 | A1 | 10/2005 |
| WO | WO 2005/096259 | A1 | 10/2005 |
| WO | WO 2005/101362 | A1 | 10/2005 |
| WO | WO 2006/013502 | A1 | 2/2006 |
| WO | WO 2007/099829 | A1 | 9/2007 |
| WO | WO 2007/135594 | | 11/2007 |

OTHER PUBLICATIONS

Crowley, J.M. et al., *Dipole Moments of Gyricon Balls*, Electrostatics Fundamentals. Applications and Hazards, Selected Papers from the Fourth IEJ-ESA Joint Symposium on Electrostatics, Sep. 25-26, 2000, pp. 247-259, vol. 55, No. 3-4.

Zehner, R. et al., *Drive Waveforms for Active Matrix Electrophoretic Displays*, May 2003, pp. 842-845, vol. XXXIV, Book II.

Office Action, Chinese Patent Application No. 200880000725.3; Dated: Jun. 29, 2010; 5 pages.

PCT International Search Report and Written Opinion, PCT/JP2008/061277, Aug. 19, 2008, 11 pages.

PCT International Search Report and Written Opinion, PCT/JP2008/061273, Sep. 16, 2008, 11 pages.

PCT International Search Report and Written Opinion, PCT/JP2008/061272, Sep. 30, 2008, 10 pages.

PCT International Search Report and Written Opinion, PCT/JP2008/061271, Sep. 30, 2008, 11 pages.

PCT International Search Report and Written Opinion, PCT/JP2008/061278, Oct. 7, 2008, 11 pages.

Bert et al, "Complete Electrial and Optical Simulation of Electronic Paper", Displays Devices, DEMPA Publications, Tokyo, JP LNKD DOI: 10.1016/J.DISPLA.2005.10.001, vol. 27, No. 2, Mar. 1, 2006, pp. 50-55.

Extended European Search Report, Application No. EP08777422, Oct. 4, 2010, 7 pages.

Chinese Office Action, Chinese Patent Application No. 200880000556.3, Apr. 8, 2011, 9 pages.

U.S. Office Action, U.S. Appl. No. 12/059,399, May 2, 2011, 29 pages.

U.S. Office Action, U.S. Appl. No. 12/059,085, May 13, 2011, 13 pages.

United States Office Action, U.S. Appl. No. 12/059,118, Sep. 14, 2011, 54 pages.

United States Office Action, U.S. Appl. No. 12/059,399, Sep. 15, 2011, 44 pages.

United States Office Action, U.S. Appl. No. 12/059,091, Oct. 19, 2011, 32 pages.

United States Office Action, U.S. Appl. No. 12/059,091, Jul. 27, 2011, 24 pages.

Extended European Search Report, European Patent Application No. EP08777423, Jun. 7, 2011, 12 pages.

Chinese Office Action, Chinese Application No. 200880000725.3, Jun. 29, 2011, 9 pages.

Chinese Office Action, Chinese Application No. 200880000556.3, Aug. 1, 2011, 10 pages.

Japanese Office Action, Japanese Patent Application No. 2009-506841, Dec. 6, 2011, 2 pages.

U.S. Office Action, U.S. Appl. No. 12/415,899, Nov. 8, 2011, 27 pages.

U.S. Office Action, U.S. Appl. No. 12/059,085, Nov. 14, 2011, 21 pages.

U.S. Office Action, U.S. Appl. No. 12/059,118, Jan. 11, 2012, 23 pages.

U.S. Office Action, U.S. Appl. No. 12/059,399, Jan. 20, 2012, 54 pages.

U.S. Office Action, U.S. Appl. No. 12/059,091, Mar. 1, 2012, 49 pages.

U.S. Office Action, U.S. Appl. No. 12/415,899, Mar. 29, 2012, 32 pages.
U.S. Notice of Allowance, U.S. Appl. No. 12/059,118, Apr. 9, 2012, 19 pages.
U.S. Office Action, U.S. Appl. No. 12/059,399, May 3, 2012, 43 pages.
JP Office Action, JP Patent Application No. 097122474, Feb. 23, 2012, 10 pgs.
EPO Communication, EP Patent Application No. 08 765 765.6-2205, Apr. 25, 2012, 9 pages.

* cited by examiner

FULL FRAMEBUFFER FOR ELECTRONIC PAPER DISPLAYS

CROSS REFERENCE TO RELATED APPLICATIONS

This application claims the benefit of U.S. Provisional Patent Application No. 60/944,415, filed Jun. 15, 2007, entitled "Systems and Methods for Improving the Display Characteristics of Electronic Paper Displays," the contents of which are hereby incorporated by reference in its entirety.

BACKGROUND

1. Field of Art

The disclosure generally relates to the field of electronic paper displays. More particularly, the invention relates to updating electronic paper displays.

2. Description of the Related Art

Several technologies have been introduced recently that provide some of the properties of paper in a display that can be updated electronically. Some of the desirable properties of paper that this type of display tries to achieve include: low power consumption, flexibility, wide viewing angle, low cost, light weight, high resolution, high contrast, and readability indoors and outdoors. Because these displays attempt to mimic the characteristics of paper, these displays are referred to as electronic paper displays (EPDs) in this application. Other names for this type of display include: paper-like displays, zero power displays, e-paper, bi-stable and electrophoretic displays.

A comparison of EPDs to Cathode Ray Tube (CRT) displays or Liquid Crystal Displays (LCDs) reveal that in general, EPDs require less power and have higher spatial resolution; but have the disadvantages of slower update rates, less accurate gray level control, and lower color resolution. Many electronic paper displays are currently only grayscale devices. Color devices are becoming available although often through the addition of a color filter, which tends to reduce the spatial resolution and the contrast.

Electronic Paper Displays are typically reflective rather than transmissive. Thus they are able to use ambient light rather than requiring a lighting source in the device. This allows EPDs to maintain an image without using power. They are sometimes referred to as "bi-stable" because black or white pixels can be displayed continuously and power is only needed to change from one state to another. However, some devices are stable at multiple states and thus support multiple gray levels without power consumption.

Electronic paper displays are controlled by applying a waveform or array of values to a pixel instead of just a single value like a typical LCD. Some controllers for driving the displays are configured like an indexed color-mapped display. The framebuffer of these electronic paper displays contains an index to the waveform used to update that pixel instead of the waveform itself.

While electronic paper displays have many benefits, a problem is that most EPD technologies require a relatively long time to update the image as compared with conventional CRT or LCD displays. A typical LCD takes approximately 5 milliseconds to change to the correct value, supporting frame rates of up to two hundred frames per second (the achievable frame rate is typically limited by the ability of the display driver electronics to modify all the pixels in the display). In contrast, many electronic paper displays, e.g. the E Ink displays, take on the order of three hundred to one thousand milliseconds to change a pixel value from white to black. While this update time is generally sufficient for the page turning needed by electronic books, it is problematic for interactive applications like pen tracking, user interfaces, and the display of video.

One type of EPD called a microencapsulated electrophoretic (MEP) display moves hundreds of particles through a viscous fluid to update a single pixel. The viscous fluid limits the movement of the particles when no electric field is applied and gives the EPD its property of being able to retain an image without power. This fluid also restricts the particle movement when an electric field is applied and causes the display to be very slow to update compared to other types of displays.

When displaying a video or animation, each pixel should ideally be at the desired reflectance for the duration of the video frame, i.e. until the next requested reflectance is received. However, every display exhibits some latency between the request for a particular reflectance and the time when that reflectance is achieved. If a video is running at 10 frames per second and the time required to change a pixel is 10 milliseconds, the pixel will display the correct reflectance for 90 milliseconds and the effect will be as desired. If it takes one hundred milliseconds to change the pixel, it will be time to change the pixel to another reflectance just as the pixel achieves the correct reflectance of the prior frame. Finally, if it takes two hundred milliseconds for the pixel to change, the pixel will never have the correct reflectance except in the circumstance where the pixel was very near the correct reflectance already, i.e. slowly changing imagery.

Further, in current electronic paper displays, all pixels must be updated simultaneously. In order to change the entire display, the previous display change must be complete. The waveform used to update the display is based on the prior value and that value is unknown if an update is interrupted.

It would therefore be highly desirable to produce an electronic paper display that overcomes the update speed and contrast constraints of current electronic paper display, thus allowing for faster, and more "real-time"-like update of bi-stable displays.

SUMMARY

One embodiment of a disclosed system (and method) for updating a bi-stable display includes a framebuffer for storing waveforms for each pixel individually. The system includes determining a current state of a pixel of the bi-stable display; determining a desired state of the pixel of the bi-stable display; and updating the pixel by applying a determined control signal to the pixel to drive the pixel from the current state to the final state. Updating each pixel occurs independently of the other pixels of the bi-stable display.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

(FIG.) 1 illustrates a cross-sectional view of a portion of an exemplary electronic paper display in accordance with some embodiments.

Figure 1:
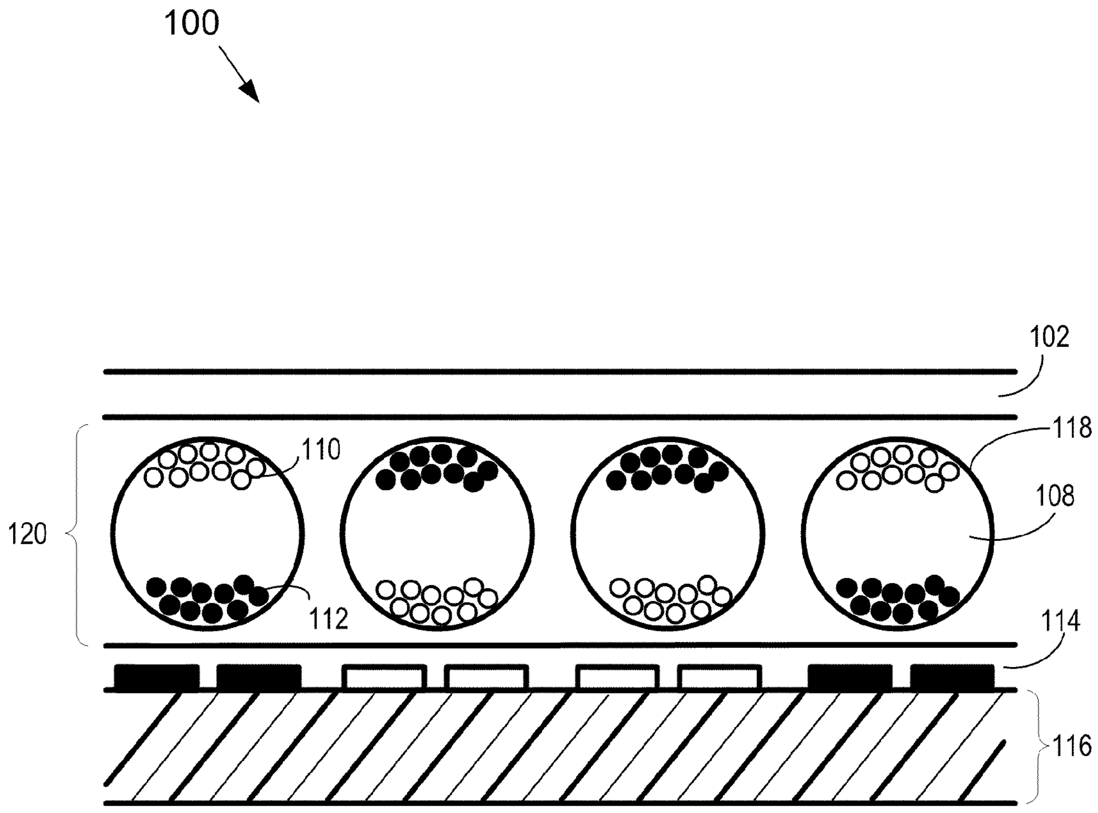

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

As used herein any reference to "one embodiment," "an embodiment," or "some embodiments" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Device Overview

Figure (FIG.) 1 illustrates a cross-sectional view of a portion of an exemplary electronic paper display 100 in accordance with some embodiments. The components of the electronic paper display 100 are sandwiched between a top transparent electrode 102 and a bottom backplane 116. The top transparent electrode 102 is a thin layer of transparent material. The top transparent electrode 102 allows for viewing of microcapsules 118 of the electronic paper display 100.

Directly beneath the top transparent electrode 102 is the microcapsule layer 120. In one embodiment, the microcapsule layer 120 includes closely packed microcapsules 118 having a clear fluid 108 and some black particles 112 and white particles 110. In some embodiments, the microcapsule 118 includes positively charged white particles 110 and negatively charged black particles 112. In other embodiments, the microcapsule 118 includes positively charged black particles 112 and negatively charged white particles 110. In yet other embodiments, the microcapsule 118 may include colored particles of one polarity and different colored particles of the opposite polarity. In some embodiments, the top transparent electrode 102 includes a transparent conductive material such as indium tin oxide.

Disposed below the microcapsule layer 120 is a lower electrode layer 114. The lower electrode layer 114 is a network of electrodes used to drive the microcapsules 118 to a desired optical state. The network of electrodes is connected to display circuitry, which turns the electronic paper display "on" and "off" at specific pixels by applying a voltage to specific electrodes. Applying a negative charge to the electrode repels the negatively charged particles 112 to the top of microcapsule 118, forcing the positively charged white particles 110 to the bottom and giving the pixel a black appearance. Reversing the voltage has the opposite effect—the positively charged white particles 112 are forced to the surface, giving the pixel a white appearance. The reflectance (brightness) of a pixel in an EPD changes as voltage is applied. The amount the pixel's reflectance changes may depend on both the amount of voltage and the length of time for which it is applied, with zero voltage leaving the pixel's reflectance unchanged.

The electrophoretic microcapsules of the layer 120 may be individually activated to a desired optical state, such as black, white or gray. In some embodiments, the desired optical state may be any other prescribed color. Each pixel in layer 114 may be associated with one or more microcapsules 118 contained with a microcapsule layer 120. Each microcapsule 118 includes a plurality of tiny particles 110 and 112 that are suspended in a clear fluid 108. In some embodiments, the plurality of tiny particles 110 and 112 are suspended in a clear liquid polymer.

The lower electrode layer 114 is disposed on top of a backplane 116. In one embodiment, the electrode layer 114 is integral with the backplane layer 116. The backplane 116 is a plastic or ceramic backing layer. In other embodiments, the backplane 116 is a metal or glass backing layer. The electrode layer 114 includes an array of addressable pixel electrodes and supporting electronics.

System and Method Overview

Figure 2:
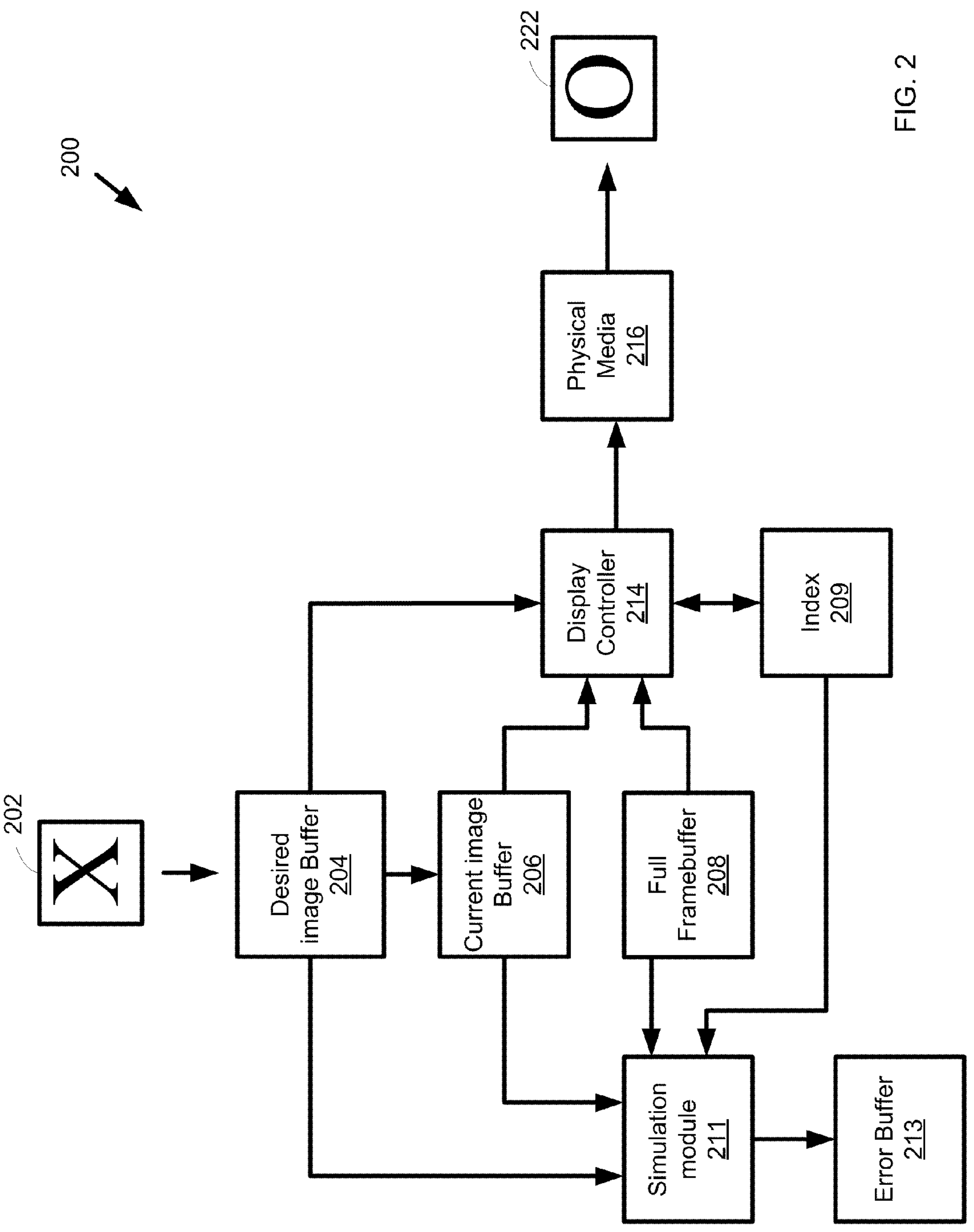
FIG. 2 illustrates a block diagram of an electronic paper display system in accordance with some embodiments.

FIG. 2 illustrates a block diagram of an electronic paper display system in accordance with some embodiments. Data associated with a desired image, or new input image 202, is provided into the system 200.

In some embodiments, the system 200 includes optional image buffers, such as desired image buffer 204 and current image buffer 206. In some embodiments, the desired image data (new input image 202) is sent and stored in an optional desired image buffer 204 which includes information associated with the desired image. An optional current image buffer 206 stores at least one current image in order to determine how to change the display to the new desired image. In one embodiment, the current image buffer 206 is coupled to receive the current image from the desired image buffer 204 once the display has been updated to show the current desired image. In one embodiment, the current image buffer 206 is updated dynamically as waveforms are applied to each pixel.

The system 200 also includes a framebuffer 208, which is large enough for each pixel to store the waveform directly, instead of having each pixel store an index to the waveform. For example, the framebuffer 208 may store thirty-two bit pairs for each pixel. One bit pair may represent each of the three possible voltages, +15, −15 and zero voltage (no change in voltage). In other words, “01” may represent +15, “10” may represent −15, and “00” or “11” may represent zero (no change). Each bit pair is applied for a twenty ms frame, and thirty-two bit pairs (or sixty-four bits) would leave room for an arbitrary waveform of 32×20 milliseconds (ms) or six hundred forty ms. The number of bit pairs may be increased if longer waveforms are desired. Therefore, a framebuffer for a 640×480 pixel screen with a thirty-two bit pair waveform would require approximately 2.46 megabytes of memory.

By keeping track of the waveform for each pixel individually, there can be complete control of the entire display, which can update individual pixels starting at any time, therefore reducing perceived latency. In some embodiments, an image update may proceed by filling all the pixel waveform bit pairs with the correct waveforms and then stepping through each bit pair for each pixel. The process of stepping through the bit pairs and updating the pixels would also clear the full framebuffer. Upon reaching the end, the image could be updated again by writing new waveforms into the bit pairs of each pixel that will be modified.

There are a number of ways to control the display using the full framebuffer 208 of bit pairs. In one embodiment, as described above, the entire display is updated simultaneously by filling every bit pair with the appropriate value to generate the correct waveform for each pixel. For instance, the thirty-two bit pairs for the upper left pixel, if the pixel were to remain unchanged, would be filled with “00”s indicating that at no time during the image update should a voltage be applied to that pixel. Alternatively, if a specific waveform was to be applied to the pixel, a series of “00”s, “01”s, “10”s and “11”s would be placed in the thirty-two bit pairs in a way that would indicate the appropriate 0, −15, and +15 volt waveform where each bit pair indicates a voltage to be applied for twenty milliseconds in one embodiment. The waveform or sequence of values would be designed to change the pixel from one reflectance value to another reflectance value at the end of the waveform.

The waveform is applied by the display controller 214 to the physical media 216 in twenty millisecond increments. After each increment, the display controller resets the bit pair that was just used to apply a voltage to the pixel back to “00” so that when the display controller reaches that bit pair again next time through the full framebuffer, it doesn't modify the pixel a second time.

Thirty-two bit pairs represent a maximum waveform of 32×20 milliseconds or six hundred forty milliseconds. In one embodiment, it is desirable to change all of the pixels simultaneously. The waveform for each pixel can be loaded in a way that the first voltage change for that pixel corresponds to the first bit pair in the framebuffer 208, the second voltage change corresponds to the second bit pair, etc. The display controller 214 uses the values from the full framebuffer 208 by accessing the first bit pair for each pixel and setting the voltages to correspond to the values in those first bit pairs. After twenty milliseconds, the display controller changes the voltages to correspond to the values stored in the second bit pairs for every pixel. This continues until the end of the longest waveform stored for any pixel.

The disadvantage of controlling the display in this manner is that the pixel can not be modified or changed independently. An alternative method in another embodiment is to cycle through the bit pairs continuously by maintaining an index value that initially starts at zero, incrementing by one until it reaches thirty-one and then returning to zero. In some embodiments, the increment happens every twenty milliseconds at which time the display controller accesses the bit pair corresponding to the index value for every pixel and applies a voltage to that pixel corresponding to the bit pair stored at that index for that pixel.

If all of the bit pairs for all of the pixels are set at “00”, a zero voltage is maintained at all of the pixels so that no pixels are updated. When the desired image 202 is changed by a single pixel, the bit pairs for that pixel are modified. However, instead of storing the waveform with the first waveform bit pair at index 0, the first waveform bit pair is stored at the next index value to be accessed by the display controller. For instance, if the current index value is five, the first bit pair for the waveform is stored at index six for that pixel and the subsequent waveform values are stored in subsequent bit pairs. If the index is currently thirty-one, the next waveform value should be stored at index zero for that pixel.

This allows the display pixels to be updated independently regardless of the current state of any other pixels in the display. If the top of the display is in the middle of an update, an update can be started on the bottom half just by writing the correct waveforms beginning in the index+1 bit pair. Any pixel change can be started at any time in the future six hundred forty milliseconds by writing sufficiently far ahead in the bit pair framebuffer.

In another embodiment it is desirable to change pixels at various times. For instance, it may be desirable to change the upper left pixel starting at time T and the pixel just to the right of it starting at time T+ΔT. If ΔT is sixty milliseconds, the waveform values can be written to bit pair index+3 where three equals sixty milliseconds divided by twenty milliseconds.

In one embodiment, it may be desirable to change the desired final value of a pixel even in the middle of a waveform. For example, if changing a pixel from black to white took four hundred milliseconds, the waveform might contain twenty bit pairs of "01" indicating +15 volts should be applied to the pixel for four hundred milliseconds. If at the two hundred millisecond point it was decided that the pixel should be black after all, it would be desirable to convert the remaining bit pairs to "10" indicating that −15 volts should be applied for the remaining two hundred milliseconds to drive the pixel back to black. In current systems, the display driver waits until the pixel is driven all the way to white and then applies the "white to black" waveform meaning that the total elapsed time is eight hundred milliseconds including both the change from "black to white" and the change from "white to black".

In one embodiment the current image buffer 206 is dynamically updated to indicate the current state of the display based on a simulation of how the physical media is being changed. For instance, after each bit pair is applied to the physical media 216, a small change is recorded in the current image buffer 206. At any time a change is made to the desired image buffer 204, the difference between the current image buffer 206 and desired image buffer 204 can be calculated and the correct waveform can be written to the bit pairs.

Dynamically updating the current image buffer requires a simulation of what is happening to the physical media based on the voltages applied. A simple model of the reaction of the physical media to voltage impulses can be made part of the display controller or an external processor. In one embodiment, the model or simulation of the physical media reaction can be a linear model where a voltage applied for twenty milliseconds always changes the reflectance of the physical media by a certain amount either in the negative or positive direction based on the sign of the voltage applied.

In one embodiment, the reflectance change of the physical media is a function of the current reflectance. In one embodiment the model also represents an error value or a probability that the reflectance change was more or less than that assumed by the model. In one embodiment, the error accumulates as the waveform is applied to a pixel and that error is stored in an error buffer 213 for that pixel. The error is the difference between the calculated reflectance value and the actual reflectance value on the physical display and can only be estimated. A simulation module 211 computes error values by taking inputs from the desired image buffer 204, current image buffer 206, full framebuffer 208 and index 209 and outputs the error to the error buffer 213. The error buffer 213 contains enough storage to remember the accumulated error for each pixel. The error magnitude is checked before each pixel is driven to a new reflectance value and if the error is too high, the pixel is reset by driving it to white or black before sending it to the new reflectance value in order to minimize the difference between an actual reflectance value and a calculated reflectance value.

Those familiar with electronic paper displays will recognize that as a pixel is driven to black or white that the reflectance changes much less than when the pixel is at the middle gray level. One way to reduce the error of a pixel is to drive it to black or white which puts it in a known state. As errors accumulate for a given pixel, it will be possible to reset the error value for that pixel by driving it to black or white before driving it to the final value.

In one embodiment a set of bit pairs for a pixel will contain a waveform indicating how that pixel should be driven in the next six hundred and forty milliseconds to move it to the desired value stored for that pixel in the desired image buffer 204. After each twenty milliseconds when the display controller 214 applies the requested voltage value to the pixel, the current image buffer 206 is updated to indicate the current state and the error buffer 213 is updated to reflect the potential accumulated error in the pixel. If it is determined that the error has accumulated enough to distort the image when a waveform is written for the pixel, the new waveform may be written in a way that the pixel is driven to black or white to eliminate the error before arriving at the final state requested in the desired image buffer 206. In other words, the waveform chosen and written in the full framebuffer for a specific pixel depends on the current state of the pixel, the desired state of the pixel and the accumulated error of that pixel. If the accumulated error is low based on the previous waveforms, a direct waveform will be used which moves the pixel directly to the new value. If the error has accumulated substantially, an indirect waveform will be used to move the pixel to white or black before settling in the final reflectance value.

For a traditional display like a CRT or LCD, the input image could be used to select the voltage to drive the display, and the same voltage would be applied continuously at each pixel until a new input image was provided. In the case of displays with state, however, the correct voltage to apply depends on the current state. For example, no voltage need be applied if the previous image is the same as the desired image. However, if the previous image is different than the desired image, a voltage needs to be applied based on the state of the current image, a desired state to achieve the desired image, and the amount of time to reach the desired state. For example, if the previous image is black and the desired image is white, a positive voltage may be applied for some length of time in order to achieve the white image, and if the previous image is white and the desired image is black, a negative voltage may be applied in order to achieve the desired black image. Thus, the display controller 214 in FIG. 4 uses the information in the desired image buffer 204 and the current image buffer 206 to select a waveform to transition the pixel from current state to the desired state.

In some embodiments, the required waveforms used to achieve multiple states can be obtained by connecting the waveform used to go from the initial state to an intermediate state to the waveform used to go from the intermediate state to the final state. Because there will now be multiple waveforms for each transition, it may be useful to have hardware capable of storing more waveforms. In some embodiments, hardware capable of storing waveforms for any one of sixteen levels to any other one of sixteen gray levels requires two hundred fifty-six waveforms. If the imagery is limited to four levels, then only sixteen waveforms are needed without using intermediate levels, and thus there could be sixteen different waveforms stored for each transition.

With most current hardware there is no way to directly read the current reflectance values from the physical media 216; therefore, their values can be estimated using empirical data or a model of the physical media 216 and knowledge of previous voltages that have been applied as described above. In other words, the update process for physical media 216 is an open-loop control system. It may be possible to obtain a fairly accurate model of the waveform/pixel interaction, but it will not be accurate for all situations. Errors or differences between the expected reflectance value and the actual reflectance value may exist. These errors or differences may be corrected by driving the pixels "to the rails," or in other words, making a pixel saturated black or saturated white. This puts the pixel in a known state. From that known state, in some embodiments, the difference between the expected reflectance and the actual reflectance has been minimized. This indicates that it is favorable to synchronize the model with the actual reflectance values by occasionally pushing a pixel to a pure white or a pure black state. In some embodiments, there is an error buffer 213 that keeps track of an estimate of the possible error and when the error gets too high for a single pixel, that pixel may be driven either all the way black or all the white before settling on a final reflectance value.

In some embodiments, the environment the display is in, in particular the lighting, and how a human observer views the image through the physical media 216 determine the final displayed image 222. Usually, the display is intended for a human user and the human visual system plays a large role on the perceived image quality. Thus some artifacts that are only small differences between desired reflectance and actual reflectance can be more objectionable than some larger changes in the image that are less perceivable by a human. Some embodiments are designed to produce images that have large differences with the desired reflectance image, but better perceived images. Halftoned images are one such example.

The system described above is a framebuffer that stores waveforms for each pixel individually. By keeping track of the waveform for each pixel individually, there can be complete control of the entire display. Individual pixel updates can start at anytime, and perceived latency may be reduced.

In other embodiments, this method of updating a bi-stable display may enable better pen tracking, video display, animation display, and overall, faster user interfaces for electronic paper displays.

Figure 3:
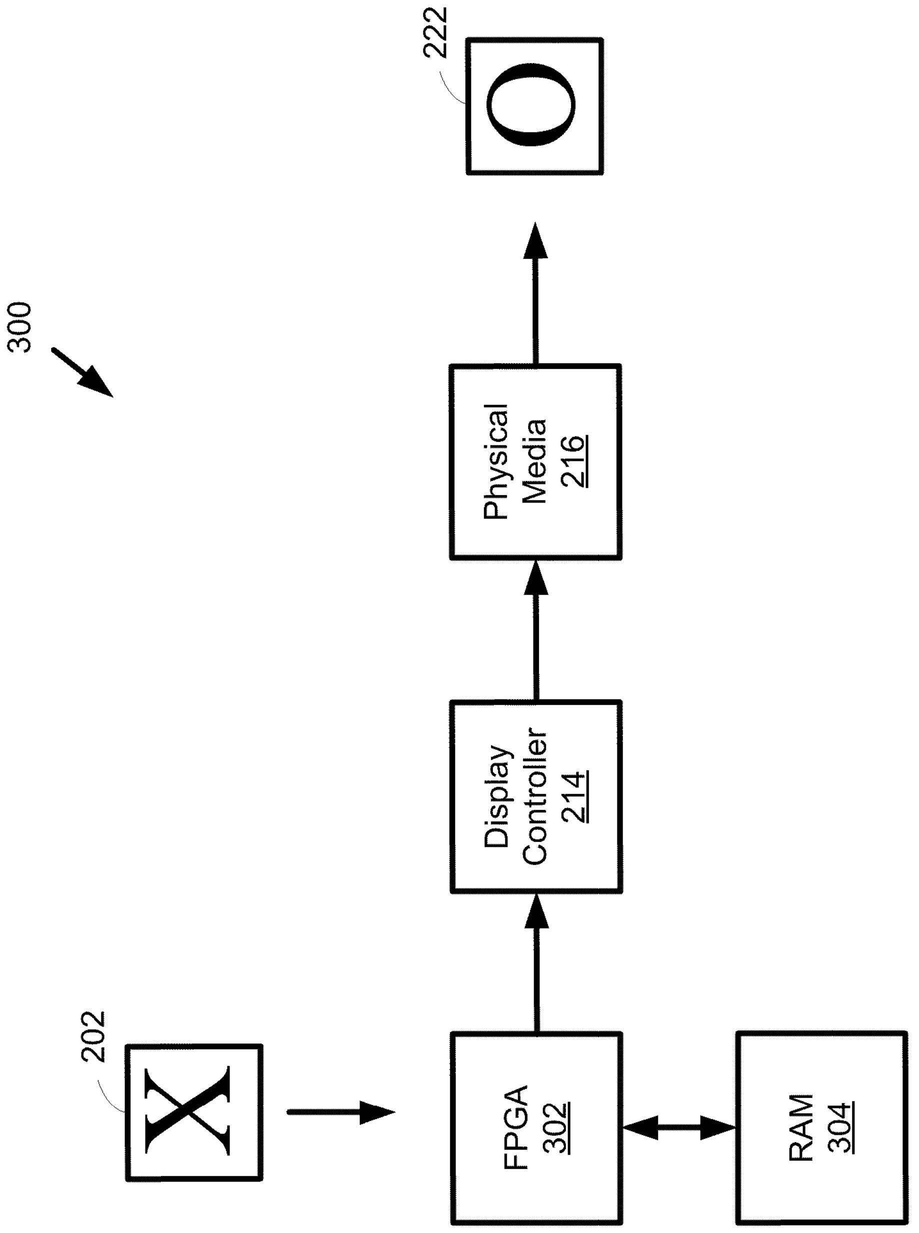
FIG. 3 illustrates a modified block diagram of an electronic paper display system in accordance with some embodiments.

FIG. 3 illustrates a modified block diagram of an electronic paper display system in accordance with some embodiments. One embodiment of the system for updating an electronic paper display would include a field-programmable gate array (FPGA) 302 which is programmed to accept a new input image 202 and to keep track of the current image buffer 206, full framebuffer 208, error buffer 213 and index 209 in random access memory (RAM) 304 and driving the display controller directly. All the calculations for the simulation of the response of the physical media and error accumulation can happen in the FPGA 302.

Figure 4:
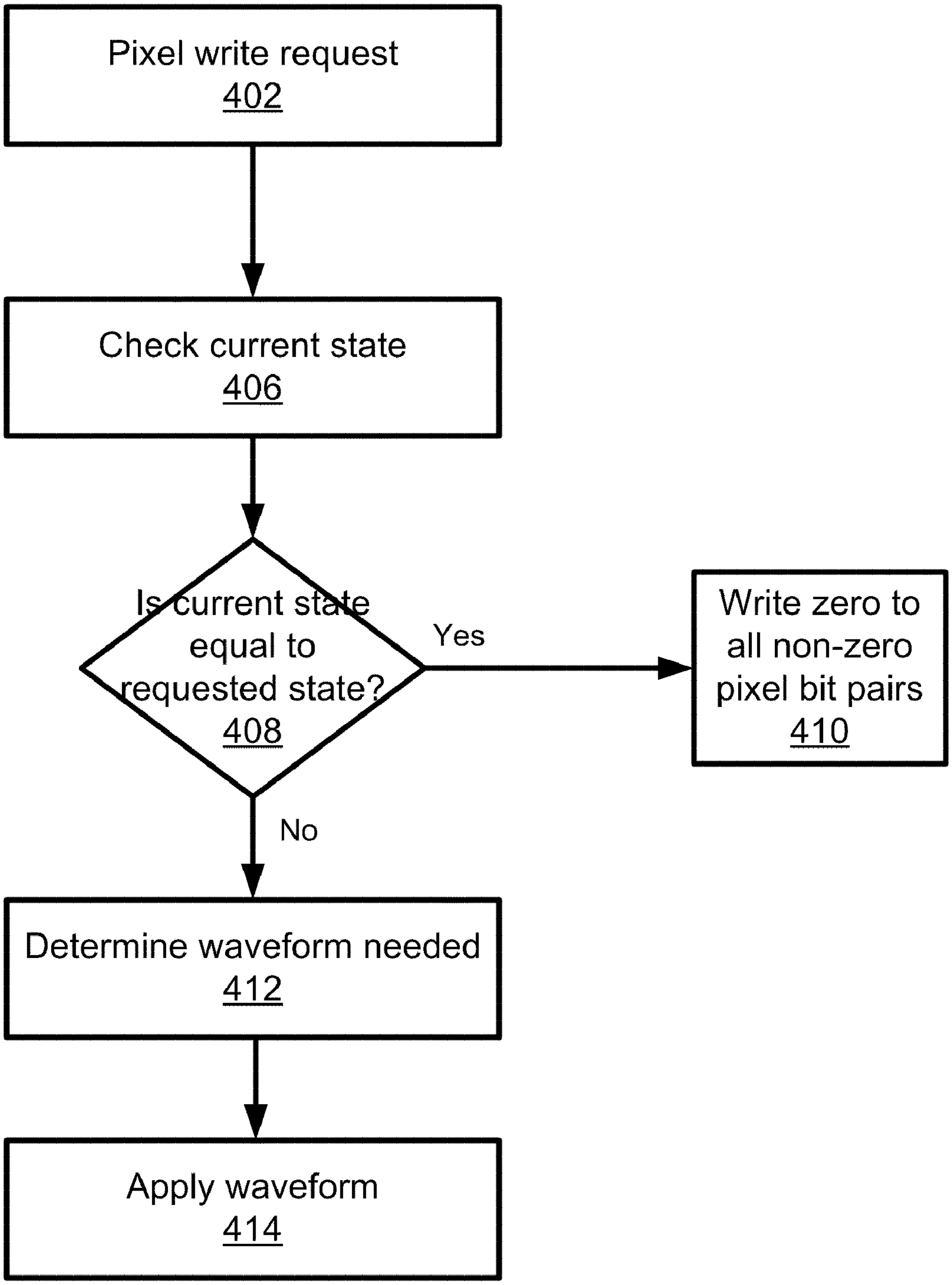
FIG. 4 illustrates a high level flow chart of a method for updating a bi-stable display in accordance with some embodiments.

FIG. 4 illustrates a high level flow chart of a method 400 for updating a bi-stable display in accordance with some embodiments. The method 400 is performed for each pixel individually, this allowing for individual pixel updates that start at any time. In other words, each pixel may be updated independent of one another with the following described method 400. A pixel write request is received 402. The current state of the pixel is checked 406.

Subsequently, a determination 408 is made as to whether the current state is equal to the requested state. If the current state is equal to the requested state (408—Yes), no action is taken. In other words, no change is applied to the pixel, and therefore the state stays the same since the current state is equal to the requested state. If the current state is not equal to the requested state (408—No), the display controller determines 412 the control signal to be applied to the pixel in order to achieve the desired state. Once the control signal or waveform is determined, the appropriate values are written to the bit pairs for that pixel 414.

Upon reading this disclosure, those of skill in the art will appreciate still additional alternative structural and functional designs for a system and a process for updating an image on a bi-stable display through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of updating an image on a bi-stable display, comprising:

determining a current state of a pixel of the bi-stable display from a current image buffer;

determining a desired state of the pixel of the bi-stable display;

determining an accumulated error amount for the pixel based on a difference between a calculated reflectance value and an actual reflectance value on the bi-stable display;

determining a control signal based on the current state of the pixel, the desired state of the pixel and the accumulated error amount of the pixel;

storing a waveform for the pixel in a framebuffer by writing bit pairs for the control signal starting at a position in an index that is based on a current index value in the framebuffer;

updating the pixel by applying the control signal to the pixel to drive the pixel from the current state to the desired state; and updating the current image buffer based on a simulation of a reaction of the pixel to the control signal driving the pixel;

wherein a beginning of the updating for each pixel occurs independently of the other pixels of the bi-stable display.

2. The method of claim 1, wherein the current state and the desired state are at least one of a same state and different states.

3. The method of claim 1, wherein the simulation is a linear model for simulating the control signal driving the pixel.

4. The method of claim 1, further comprising:

storing the accumulated error amount for the pixel.

5. The method of claim 1, wherein the position in the index is a next index value after the current index value.

6. A system for updating an image on a bi-stable display, comprising:

means for determining a current state of a pixel of the bi-stable display from a current image buffer;

means for determining a desired state of the pixel of the bi-stable display;

means for determining an accumulated error amount for the pixel based on a difference between a calculated reflectance value and an actual reflectance value on the bi-stable display;

means for determining a control signal based on the current state of the pixel, the desired state of the pixel and the accumulated error amount of the pixel;

means for storing a waveform for the pixel in a framebuffer by writing bit pairs for the control signal starting at a position in an index that is based on a current index value in the framebuffer;

means for updating the pixel by applying the control signal to the pixel to drive the pixel from the current state to the desired state; and means for updating the current image buffer based on a simulation of a reaction of the pixel to the control signal driving the pixel;

wherein a beginning of the updating for each pixel occurs independently of the other pixels of the bi-stable display.

7. The system of claim 6, wherein the current state and the desired state are at least one of a same state and different states.

8. The system of claim 6, wherein the simulation is a linear model for simulating the control signal driving the pixel.

9. The system of claim 6, further comprising:

means for storing the accumulated error amount for the pixel.

10. The system of claim 6, wherein the position in the index is a next index value after the current index value.

11. An apparatus for updating an image on a bi-stable display, comprising:

a current image buffer;

a module for determining a current state of a pixel of the bi-stable display from the current image buffer, for determining a desired state of the pixel of the bi-stable display, for determining an accumulated error amount for the pixel based on a difference between a calculated reflectance value and an actual reflectance value on the bi-stable display, for determining a control signal based on the current state of the pixel, the desired state of the pixel and the accumulated error amount of the pixel, for updating the pixel by applying the control signal to the pixel to drive the pixel from the current state to the desired state and for updating the current image buffer based on a simulation of a reaction of the pixel to the control signal driving the pixel; and a framebuffer for storing a waveform for the pixel by writing bit pairs for the control signal starting at a position in an index that is based on a current index value in the framebuffer;

wherein a beginning of the updating for each pixel occurs independently of the other pixels of the bi-stable display.

12. The apparatus of claim 11, wherein the current state and the desired state are at least one of a same state and different states.

13. The apparatus of claim 11, wherein the simulation is a linear model for simulating the control signal driving the pixel.

14. The apparatus of claim 11, further comprising:

an error buffer for storing the accumulated error amount for the pixel.

15. The apparatus of claim 11, wherein the position in the index is a next index value after the current index value.

* * * * *